United States Patent [19]

Bruch

[11] Patent Number: 4,593,611
[45] Date of Patent: Jun. 10, 1986

[54] VINIFICATION APPARATUS

[76] Inventor: Guy Bruch, 48 rue Rosa Bonheur, 33000 Bordeaux, France

[21] Appl. No.: 471,466

[22] Filed: Mar. 2, 1983

[30] Foreign Application Priority Data

Mar. 12, 1982 [FR] France ............... 82 04564
Feb. 18, 1983 [FR] France ............... 83 02664

[51] Int. Cl.⁴ ............................................. C12C 7/10
[52] U.S. Cl. .................................. 99/277.1; 426/15; 435/291
[58] Field of Search ............ 99/275, 276, 277, 277.1, 99/277.2, 278; 426/7, 11, 15, 330.4; 435/289, 291

[56] References Cited

U.S. PATENT DOCUMENTS

| 704,533 | 7/1902 | Garrett | 426/15 |
| 2,561,072 | 7/1951 | Reich | 426/15 |
| 2,813,026 | 11/1957 | Marcilly | 426/15 |
| 3,563,157 | 2/1977 | Lenz | 99/278 |
| 3,741,770 | 6/1973 | Van Olphen | 426/15 |
| 4,336,329 | 6/1982 | Hesse | 435/289 |

FOREIGN PATENT DOCUMENTS

| 2908355 | 9/1980 | Fed. Rep. of Germany . |
| 1392674 | 2/1965 | France . |
| 1499395 | 9/1967 | France . |
| 2213672 | 12/1972 | France . |
| 2269874 | 4/1974 | France . |
| 2332326 | 11/1975 | France . |
| 2481787 | 9/1979 | France . |
| 2483864 | 6/1980 | France . |

OTHER PUBLICATIONS

"Digital Computer Applications to Process Control" Proceedings of the 5th IFAC/IPIP International Conference, The Hague, the Netherlands, Jun. 14–17, 1977, North Holland Publishing Company, Amsterdam, N.Y.-Oxford.
"Pompes a Chauleur" Revue pratique du froid et du conditionnement d'air 15-2-1981.

Primary Examiner—Robert W. Jenkins
Attorney, Agent, or Firm—Mason, Fenwick & Lawrence

[57] ABSTRACT

Vinification apparatus is disclosed as including at least one vat containing a fermenting must, at the upper level of which is formed a hat of solid components. A cooling and heating mechanism includes a pump and conduits for withdrawing at least a part of the must and, after thermal exchange, reinjecting the must into the vat. The thermal conditioning, whether heating or cooling, is controlled to establish a predetermined temperature gradient in space within the vat and predetermined temperature variations in time, whereby the quality of produced wine may be controlled accordingly.

39 Claims, 15 Drawing Figures

VINIFICATION APPARATUS

BACKGROUND OF THE INVENTION

The present invention relates to improvements to materials and processes used in oenology. It is known that during the vinification of a must, temperature conditions are one of the most important factors in producing of a quality wine. For several years, indeed, studies by researchers have shown that the physical qualities are at least as important, if not more so, than the chemical conditions of the fermentation and vinification.

A minimal temperature must be reached in order for the alcoholic fermentation to begin. However, after a certain time, the release of heat is such that the temperature can rise sharply with destruction of the yeasts, the premature cessation of the sugar-alcohol transformation and deterioration of the quality of the wine.

On the other hand, if the temperature is too low, the fermentation of the must starts slowly and under poor conditions.

Empirical solutions for cooling or heating (trickling on the vats, water circulation exchanger, vat fractionning . . . ) are used in the wine storehouses to overcome these problems, without being certain of attaining the optimal quality desired.

The integral control of the wine throughout the fermentation period must provide, through physical processes, a product requiring progressively fewer corrections by chemical treatments.

According to the present application, the invention concerns the improvement of traditional techniques and the adaptation of existing installations or installations having several vats.

Since the invention corresponds to a type of installation that is particularly flexible and adaptable to the most diverse cases, it is necessary, in order to avoid considerable investment, to provide very flexible arrangements and to ensure that they perform well. Several preliminary remarks are, in fact, necessary.

It is evident that when taking into consideration installations such as those of FIG. 1, which will be described herein-below, numerous apparatus can be common to several vats. Furthermore, it has been noted that in most of the existing vats, due to the aerobic character of the fermentation phenomena, most of the reaction occurs adjacent to the surface of the liquid mass; it is noted in particular temperature gradients of about 10° C. in the liquid layer of about two meters under the surface and the "hat" forms whereas below this upper layer, the homogeneity of temperature is very noticeable, the gradients being very slight. It can thus be said that at most it would be useless to intervene beneath a depth of approximately two meters, but this allows devices to be envisaged according to the present invention, a large part of which is disposed towards the top of the vat.

It is noted in a surprising manner that the introduction through the top part of all the elements intervening in the vat not only considerably simplifies the adaptation to all existing vats, but considerably improves its yield when it is essentially the reactional mass the closest to the air that is treated according to the invention.

Furthermore, it has been noted that due to the present invention and this is most surprising, by adjusting the regulating program it is possible, from the same vintage to obtain wines that are extremely different, although they originate from the same grapes.

In order to do this according to an essential characteristic of the invention, it is introduced through the upper opening of the vat a plunging column containing all or part of the intervention and collection devices according to the invention (drawing off and injecting fluids, temperature control, etc . . . ). In other words, all the elements contained in the vat K of FIG. 1 can be gathered in this plunging column.

Furthermore, the plunging column of a series of vats are adapted in such a way that they can be placed in relation with central control and regulating equipment, and a central thermal energy or refrigeration supply.

Thus, it is possible from the same raw material to obtain according to the vats and programs identical or very different wines, as will be shown by the following examples.

Another characteristic of the invention is bound to the fact that the analysis of the thermal evolution of a vat during vinification, shows a temperature presence of the gradient or, further, the existence of at least two distinct temperature zones, which, due to the particularities of the injection system described herein-under, only execute the programmed adjustment of a part of the vat and consequently to reduce the quantity of energy required (heating and refrigeration). This reduction can reach or exceed 50% of the total energy normally required.

In order that the technical characteristics and advantages of the present invention be better understood, examples of embodiments will be described which, of course, in no way limit the scope and application of said invention.

Reference is made to the following Figures that show diagrammatically:

FIGS. 5, A, B and C are axial cross-sections of variants of injectors according to the invention;

FIGS. 7 A to D are programmed temperature curves expressed as time.

In the various Figures, the same numbers or letters designate equivalent elements even for different variants of embodiment.

The present invention proposes (by referring to the Figures) a process designed for temperature adjustment of heating and refrigerating apparatus and allowing production in the vats where the vinification is carried out, of red and white wine, and controls as a function of temperature all of the liquid during vinification (temperature rendered homogeneous) according to the required curve as a function of time.

The characteristic equipment comprises:

A cold generator. This generator can comprise a hermetic or semihermetic refrigeration circuit (Gp), but may also be equipped with a compressor known as an "open compressor", driven either by an electric motor, or by a connection, by an agricultural tractor (T) fitted with a power coupler (F). The refrigeration circuit functions, either in direct expansion, or by the intermediary of a glycolated water circuit.

A heat generator. This generator can be constituted by mounting a refrigerating installation with a heat pump, or more generally by a hot water boiler system (Ch).

An exchanger system (E) (wine heat transporting fluid). It is advantageously constituted by a liquid-liquid exchanger (with sheets or plates, for example) receiving from one side the wine circuit (Ev) and from the other side a double glycolated water/hot water circuit. In this case, the original exchanger comprises referring to the circulation of the heat-transporting fluid a double path: hot water (Ec)/cold water (Ef).

An apparatus for pumping the fluids. It comprises a pump in the hot circuit (Pc), a pump in the cold circuit (Pf).

A pumping circuit (Pv), made of stainless steel or bronze, connected in the circuit of the wine and connected to the processing vat.

Sampling a liquid (A) in the processing vat, the circuit of the wine in association with the exchanger comprises, in the upper part of the vat (K), a floating strainer or hose (SI) able to rise in the vat with the level of the liquid (and always above the "hat", i.e. the constituant part of the floating column found in the upper part of the vat in red vinification). The reinjection is carried out in the lower (or upper) part by perforated tubes or nozzles (R1, R2) in the shape of a star; such a distribution of flow of controlled wine renders the temperature distribution uniform in the vat.

A temperature control system (Reg T) comprising:
the display of instructions either manual or automatic (programmed),
the display of the effective temperature of the wine being processed, preferably digitally;
the automatic adjustment of the instruction temperature (connected up to a probe or sampler placed in the vat),
power apparatus at the adjustment output, by proportional action and by action on the modulating values (VI et V2) in order to obtain a high precision of adjustment.

A programming system (Prog) of the temperature as a function of time, preferably by digital control. This device allows, due to the use of a microprocessor, the introduction of the programming by the user, either by means of a key board (Cl) (programming by multi-segments) or in an even more simple way by means of a pre-registered recording cassette (Bm) comprising in terms of previously analyzed parameters, the entire control of the vinification process and all the necessary security, or, further, by means of magnetic dead memory (prerecorded read only memory PROM).

The temperature sampling system (resistance or thermocouple probe, suitably protected, is preferably lodged in the floating strainer (SI) or, further, disposed in the circuit of wine, for example, adjacent to the reinjection (S4).

An air injection device (I). In vinification, the "raising" consists in drawing off the liquid at the bottom of the vat and in reinjecting it to the top after passage in an intermediary aeration tube. As in the device according to the invention, the liquid circulates permanently, it only remains to add the aeration effect in order to obtain the equivalent of a raising.

This aeration action is easily produced according to the invention, by an air injection placed in the reinjection circuit, a valve (V5) that admits or does not admit air into the circuit.

The control of this (V5) can either be actuated by a pre-set clock (P) or by a heat or cold activated detector for adjustment operation (an action extended fairly long after the narrow sensitive band of the modulated adjustment during the proportional action) or by a detector complementary to that of the temperature, for example, by automatic refractometry (capt), or by detection of $CO_2$. The movement of this valve can, furthermore, be actuated by the programming.

The distribution of air by injection from the bottom of the vat facilitates the diffusion of air in the volume of wine being processed and encourages its fermentation.

Furthermore, the presence of the circulation pump can be used for the "raising" in a manner simplified by a bidirectional valve (V6) switching over, when necessary, the pressing reinjection (with or without air) from distribution nozzles R1 and R2 in the vat by injection of the wine above the "hat". This action can be executed in combination or not with the opening of the air injection valve (V5).

The actuation of the valve can be operated:
either by a clock,
or by an auxiliary detector,
or by the programming.

Another version of the equipment according to the invention is to adjust the temperature of a buffer vat at a programmed temperature, and to operate the circulation pump of the wine by control of the adjustment; this system is more expensive to operate.

Furthermore, the apparatus such as described in the invention can be used outside the vinification periods as a system of clarifying the wine by cold prior to bottling.

With this purpose, the apparatus comprises a tank (STK) equipped with appropriate electrovalves (V3 and V4) adapted to receive the tartric salts in contact with the wine throughout the processing period. The programming can be in this case used to impose cooling and processing times.

(ENR) is a register or recorder responsive to the temperature readings of the probes (S2,S3) for controlling the correct operation of the clarification system and to the probes (S1) or (S4) for providing good thermal conditions for the vinification.

This invention contemplates a servo-control system capable of adjusting several vats at the same time.

Figure 1:
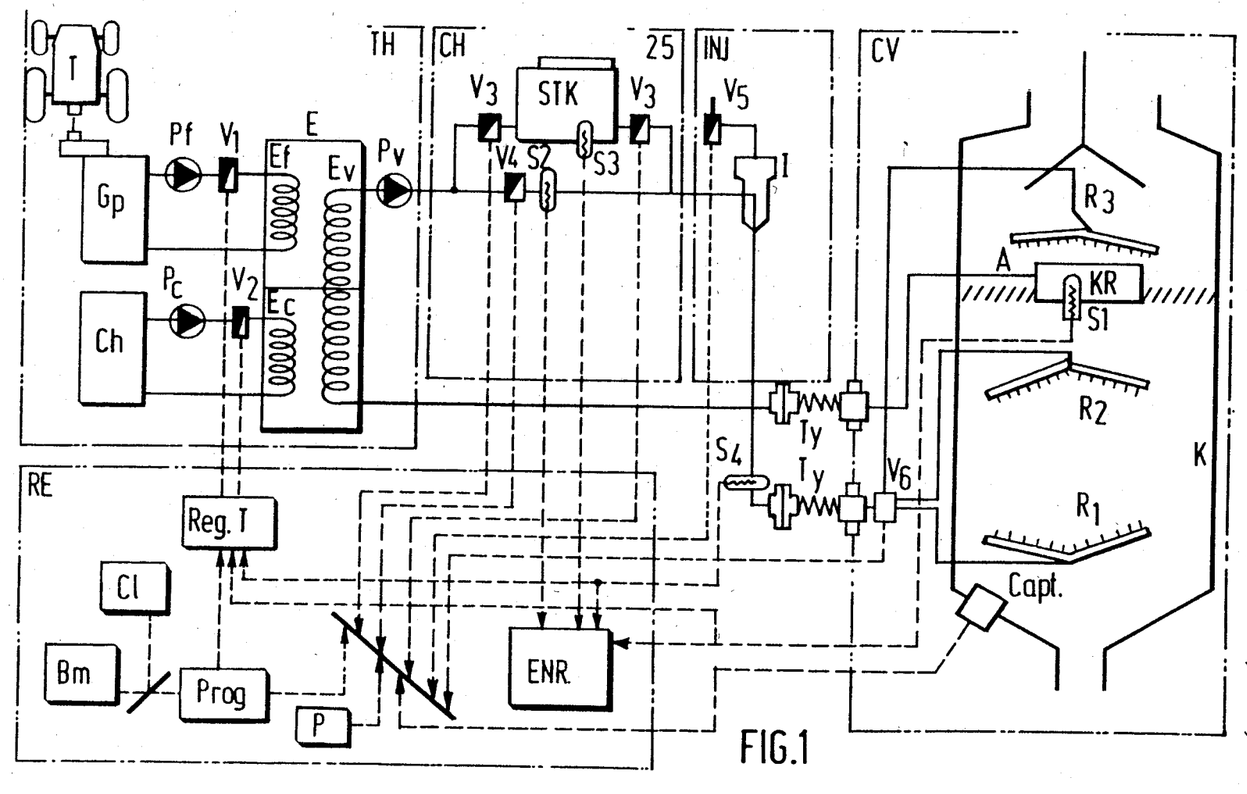
FIG. 1 is a diagram of the assembly of the installation according to the present invention.

This installation can thus be defined in following five constituent assemblies diagrammatized in FIG. 1 by dotted lines: the vat and its accessories CV, control and recording apparatus RE, the thermal/refrigeration assembly TH, the air injector INJ, and the storing of chemical additives CH.

Components Ty are flexible connection pipes of the fire fighting type or hose pipes that allow the assembly CV and assemblies TH and INJ to be connected.

Figure 2:
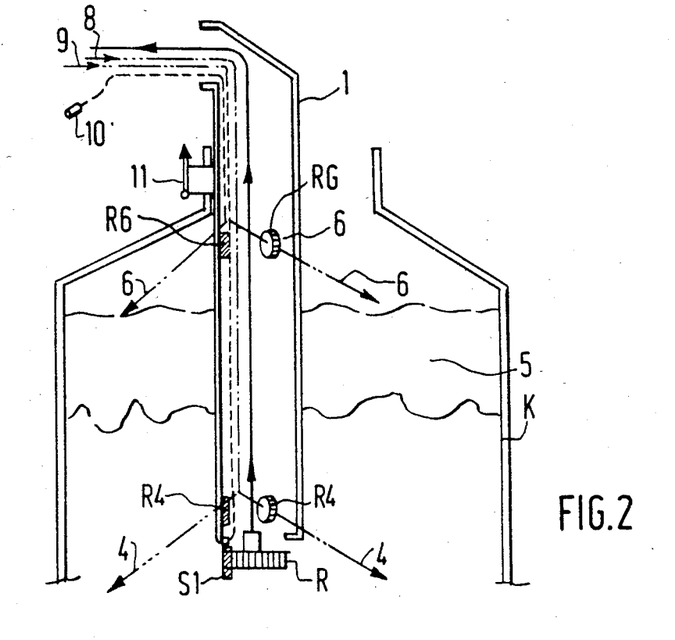
FIG. 2 is a vertical cross section of the top part of a vat equipped with a plunging column according to another embodiment of the invention.

With reference to FIG. 2, column 1, for example, having a generally cylindrical shape, is disposed into the liquid contents 5 of vat K by passing through its upper opening. The column 1 is preferably disposed substantially vertically and is adjusted as to its depth of insertion into the liquid 5 by any sliding support and adequate height, represented diagrammatically as element 11 of FIG. 2.

The column 1 contains pipe A connected to strainer R for drawing off the liquid 5.

It presents on its outside wall injectors R4 and R6 serving the same purpose as those in FIG. 1 and connected respectively to feed pipes 8 and 9 shown in dotted lines.

Probes such as S1 allow the temperatures to be measured and they are connected through conduit 10 to recording and adjustment measurement apparatus.

Injectors R4 and R6, that will be described hereinunder in detail, can thus eject the liquids, as arrows 4 and 6 indicate diagrammatically, and this, according to the positioning of column 1 either in the liquid 5 under the hat at position (4), or above at position (6) by aspersion of the hat, as shown in FIG. 2.

Immediately, it can be seen that advantageously the column 1 is cylindrical or prismatic so as to be able to slide vertically without running into the "hat" or breaking it, which is more likely with arrangements such as those of FIG. 1. Furthermore, during emplying of the vats, the hat is lowered and does not risk deteriorating as would occur when column 1 is inserted through its lateral surface.

Figure 4:
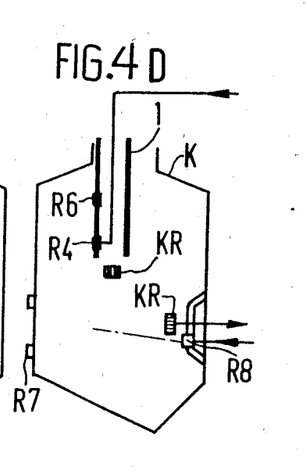
FIGS. 4A to D are, variants of vats fitted with attached columns and devices according to the invention.

As shown in FIG. 4, it is also possible to use injectors mounted in the walls of the vat or in the man-holes and other access traps (FIG. 4D) as will be described hereinunder in more detail.

Figure 3:
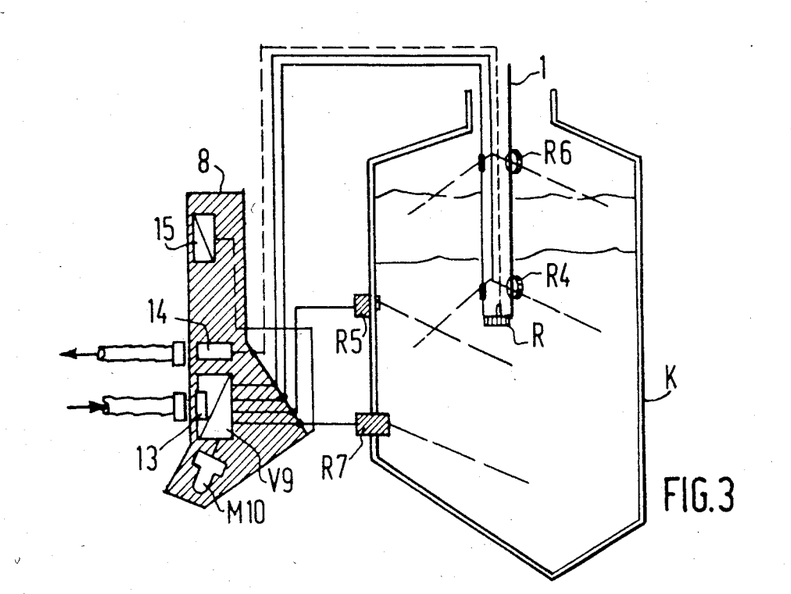
FIG. 3 is a vat assembly equipped with a column and a control regulating assembly according to the invention.

It is thus possible to connect column 1, to these components of actuation, control, adjustment and feed included in a unit or multifunctional block 8, as shown in FIG. 3. The block 8 can be fixed and connected to vat K or possibly be mobile.

FIG. 3 shows column 1 connected by the group of conductors and pipes to this multifunctional block 8 that comprises essentially multiple valve V9 and its motor M10, the reinjection connections 13, the aspiration connection 14, and the commutation system 15 for controlling "the raising" of the air necessary for the oxygenation, as supplied through the different injectors (R1 to R7).

The pipe-lines connected to inputs 13 and 14 can be of the T type of FIG. 1 and allow connections to assemblies TH and INJ, if these are not already included the multifunctional block 8.

FIG. 3 also represents diagrammatically injectors R5 and R7 that can possibly be mounted on the walls of the vat itself, which is not always possible, either because it is not desired to modify the vat itself, or because this presents complex problems, as is the case with vats made of cement, for example, or old-fashioned vats. FIG. 3 shows injectors R5 and R7 associated with injectors R4 and R6 of column 1, and injectors R8 and strainers KR are disposed on a man-hole or other door or access trap as variously shown in FIG. 4.

It is seen that in addition to the use of strainer KR and injectors R4 and R6 of the column 1 the injectors R5 and R7 of the vat may used with an injector R8 of the access door to create internal movements and temperature gradients, if necessary. Thus, in FIG. 4A, aspiration occurs at the top, and reinjection occurs at the bottom and in the center; in FIG. 4B, aspiration occurs at the top, and injection occurs at the bottom and the top; in FIG. 4C, aspiration occurs at the top, and rejection above and beneath the hat; in FIG. 4D, pressing occurs at the top and, on the lower door aspiration and reinjection occur.

Figure 5:
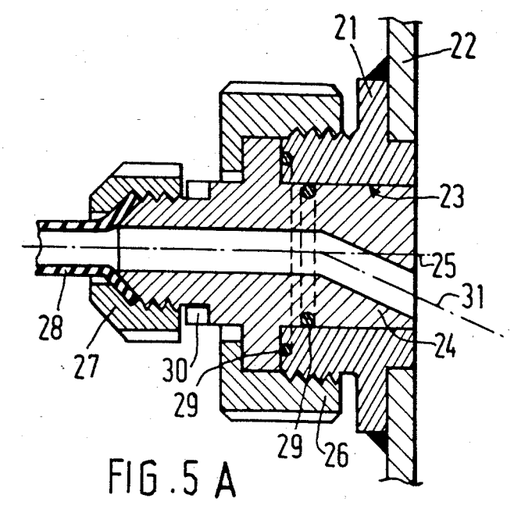

The injectors may be mounted on the column or possible on the walls of the vat (stainless steel vat, for example) as variously shown in FIG. 5.

FIG. 5A shows a wall 21 of the column or possibly of the vat, the right side being the side where the liquid is ejected (outside the column inside the vat) which, as can be seen, presents a smooth surface. A flange 21 is fixed within a hole of wall 22, for example, by welding. Bore 23 of the flange receives the body of an injector 24, which has the same axis 25 and is retained therein by ring 26; rings 29 ensure sealing, even if collar 26 is slightly loosened, thus allowing the injector 24 to be pivoted by the desired angle by acting on screw 30. The injector is pierced by a conduit inclined along line 31, the flow thus receiving a preferred orientation other than perpendicular to the walls. The rotation of the screw 30 allows the orientation to be varied laterally and also with respect to the horizontal. Therefore, a suitably directed flow is thus obtained allowing through hydraulic route a total or localized brewing of the liquid volume in order to create temperature homogenity, the preferred gradient temperature zone or any other desired effect. Feed tube 28 is fixed on swelling 24 by any known means 27;

It is also possible to use injectors having several jets, such as that shown in FIG. 5B or equipped with asperating or spraying devices (especially below the hat in order to increase oxygenation).

It is also possible, as shown in FIG. 5C, to mount the injectors and/or strainers in a man-hole or other door or access trap, which is particularly adequate when the vat is made of cement or difficult to pierce or, further, when the vat is in a location in which it is difficult to mount from the top a column that is not very long and is therefore only immersed within the liquid to a shallow depth.

In this case, trap 31 closing the hole of wall K is fixed by any tightening or clamping means such as bolts 32. On this trap 31 can be mounted injectors such as 34, strainers such as 35 and probes such as 36. In the case of this figure, the inside of the vat is disposed towards the left.

Furthermore, injectors such as those shown in FIGS. 5A and B can be mounted in a more flexible way and, for example, on spherical devices or jointed, ball and socket systems, which allow orientations without the necessity of cranked holes (as in FIGS. 5A and 5B) and on the different supporting devices, for example, an eccentric, screw, etc.).

The orifices of the injectors do not project into the vat and if they are not in use they can be sealed with standard plugs or screwed down so as not to protrude.

In the case of certain more delicate materials, for example, in the case of certain plastic materials, it is preferable to mount the injectors at the time of construction; if not, it is possible to glue them or weld them or by any other means known per se adapted to the case of the plastic material used.

It is also noted that in certain cases strainers cannot be used for the aspiration but a connection may be made to a racking valve and joined to the multifunctional block.

The use of the vinification apparatus according to the invention is further enlarged by the association of the apparatus to an external cooler adapted to absorb the temperature elevation peaks. This apparatus—particularly suitable since it economizes both investment and energy—is constituted by a direct expansion cooler, the evaporator of which is immersed in a large capacity vat of water.

This tank of iced water countaining 200 to 300 hl represents about 300 to 500 kilo frigories at 4° C. in the example cited for an environment close to 20° C. This type of vat being often available in wine production, prevent a substantial increase of temporary by causing iced water to circulate in a plate exchanger. Pump and exchanger constitute apparatus widespread in wine storehouses.

Figure 6:
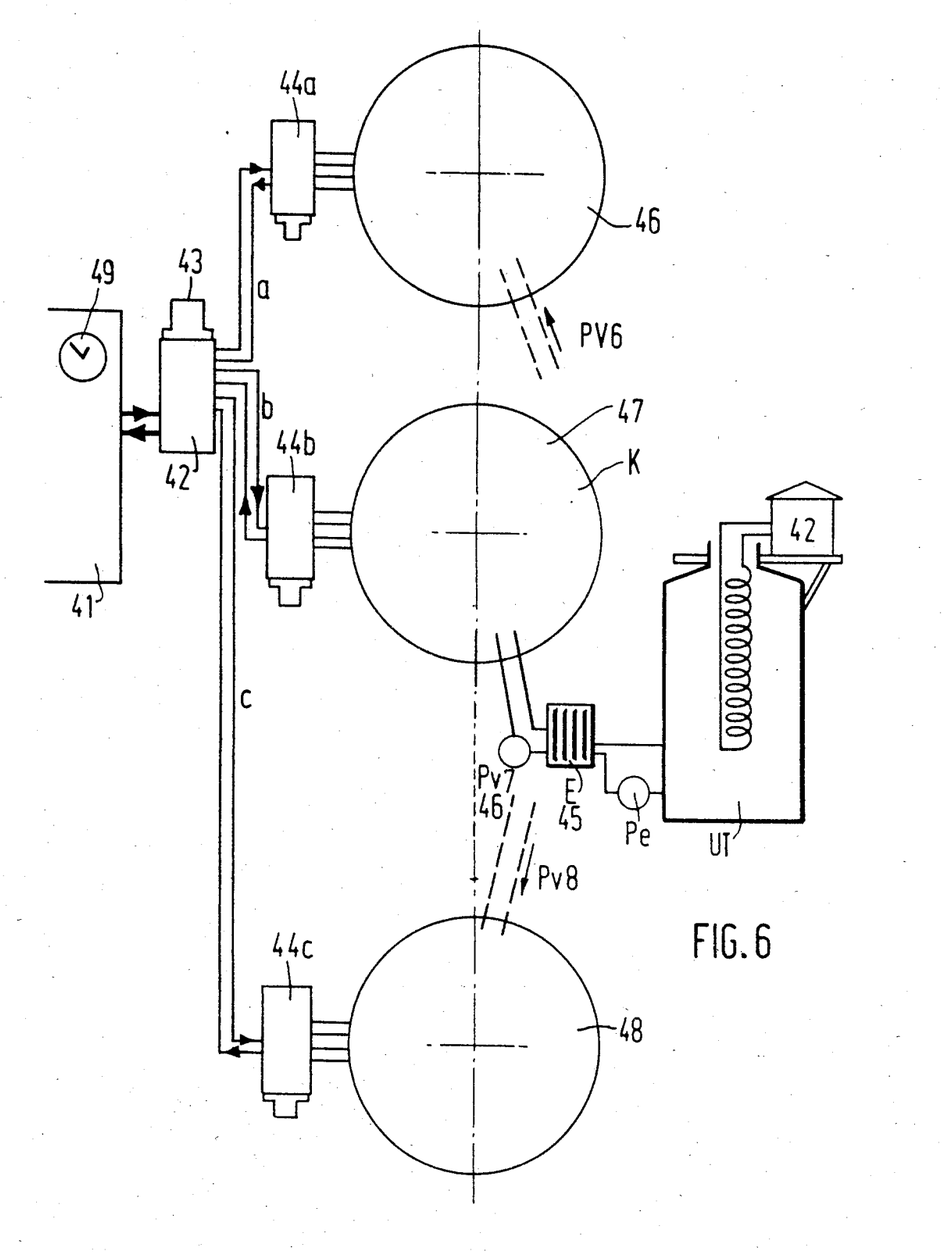
FIG. 6 is an assembly of vats mounted in a common installation according to the present invention.

FIG. 6 shows an exploded view of such an installation, wherein there is included a buffer unit VT, a vinification vat 47, a refrigeration installation 42, an immersed evaporator 43, water pumps 44 and Pe, a water/wine exchanger 45 or E and a wine pump 46 or Pv.

The vinification apparatus such as described hereinabove and diagrammatized in FIG. 1 can allow, due to the programming, simultaneous processing of several vats including different ranges of temperature, if necessary. Furthermore, the "vinification-cooler" association allows such a processing to be carried out in the best conditions.

The vinification process implying the transformation of the sugar contained in the must into alcohol by alcohol fermentation produced by the action of the yeast brings about an extraction of colors and perfumes during this transformation, the overhall process importing a characteristic quality to the wine obtained.

The programming system of the invention allows the desired results to be accelerated and modified by controlling the principal effects due to the temperature as a function of time.

Thus, a rapid acceleration (type A herein-below) (in red vinification) of the temperature at the beginning of the vinification combined with a suitable stirring in the processing vat, leads to the rapid formation of a wine having excellent coloration and strongly perfumed (it is thus possible to rack off rapidly before the end of the fermentation, thereby obtaining a saving of investment in equipment of vinification vats, as explained in the example of the fermentation in clear juice).

Figures 7, 7D:
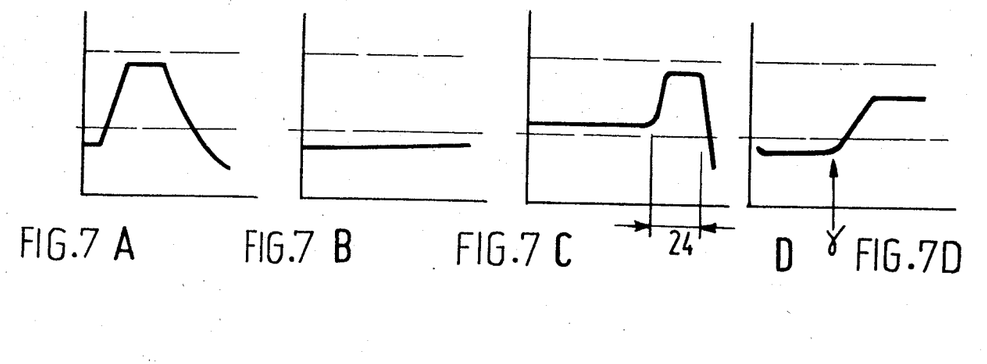

Four different programmings of temperature in time are shown in FIG. 7 giving rise to four types of wine produced from the same harvest:

Example A—a more full-bodied wine (color, perfume—case described herein-under); (in red)

Example B—slightly colored wine; (in red)

Example C—color extraction in alcohol medium; (in red)

Example D—point indicated in γ defined as corresponding to the transformation (in white) of 90% of the sugar.

A suitable increase of temperature followed by a level stretch giving a high quality wine.

This point γ corresponding to a certain fermentation state can, for example, be defined by densiometric or refractometric measurement.

The invention thus concerns, in addition to the vinification programmes, programming systems applied not to one vat but to 2, 3 or n vats according to the case described herein-below.

Due to the fact that the evolutive phenomena are slow and consequently the programming does not have to prescribe rapid temperature variations, the system is easily adapted to the simultaneous regulation of several vinification vats.

As shown in FIG. 6, the pump-energy emitter component 41 comprises a multipath orientation block 42 driven by motor 43, each of these paths (a), (b) and (c), i.e. three paths in the example, being connected to multifunctional blocks 44a, 44b, 44c incorporated integrally respectively their vats 46, 47 and 48.

If the objectives of temperature considered at each instant must be the same for the three vats, the successive commutation of the probes temperature associated with the vats 46, 47 and 48 by the regulator-programmer system, will control the level and extent for each vat of the stirring, rising, heating and cooling functions.

If the objectives of temperatures considered at each instant must be different for each of the vats, the control computer must be equipped with multi-programming.

The commutation of paths a, b, c is activated by a clock (49) setting a processing time on each of the paths.

However, a more elaborate system for the interpretation of the differences observed between each order with respect to the measured values of temperature, obtained by scanning the temperature probes by the programming system, rapid scanning with respect to the thermal rythm, but without commutation of the fluid circulation paths, allows the generator to be connected by the "multiple block" only to the path to be treated, detected by the analysis during scanning of the temperature probes.

Three vats of vinification can be cited as example:

EXAMPLE 1

Case of identical programming for identical processing of the three vats

Electronic scanning of the temperature probes of the three vats is carried out successively, in order to compare them with respect to the program.

(a) All the vats are maintained at a temperature within the range of the permitted temperatures; every hour or half-hour, the energy distribution is successively switched to each of the vats.

This example is practiced the most frequent.

(b) When a single vat reaches the limit of the range, an alert signal lights up.

The multifunction blocks on the involved vat control the energy flow distributor until the temperature discrepancy has been eliminated, and the process returns to step (a).

(c) If at least two of these vats reach the limits of the tolerable difference range on the programmed temperature, the alert signals light up.

(1°) A priori, one of the vats is processed by turning of the distributor unit of the vat involved.

If the sharp increase of temperature is dangerous—case of too rapid elevation—the non-processed vats are operated on by turning off the water circulation connected to the complementary cooler.

(2°) If the total power of the vinificator is appropriate, taking into account the noted rapidity in the temperature variation of the vat, distribution of the energy flow is continued by acting successively on each of the vats during a pre-determined period, for example, one hour on each vat, this processing period being set by a clock.

EXAMPLE 2

Case of several vats presenting several programmes allowing the production of wines having different characteristics The apparatus comprises multiprogramming, "n" programmes acting on "n" vats.

As described unit above, switching is effected by the energy distributor on the vat(s) that necessitates an action with respect to the process of the involved programme in time; but this switching is only effectine if the temperature measurements indicate that the limit of the permitted temperature range has been maintained.

It is more worthwhile, in the case of processing different vats in multiprogramming, to combine the action of the cooler with the programmed machine, the cooler allowing a vat to be placed on stand-by until the program becomes free, whereby mixing the liquids is avoided or limited.

The programmed system according to the invention comprises a keyboard that allows—other than the actuation or the modification of the programming by an ON/OFF personalized code—the introduction of simple functions, for example, when starting processing. The temperature of the must that fills the vat is introduced, the system allowing instead of the shifting of the zero in the programme curve, a fixing at the appropriate point on the starting section of the curve.

The programming system is designed to allow the introduction of complementary data issuing from a sensor that can be other than a temperature probe, more particularly a densiometer, nephelometer or refractometer.

The transmitted data acts on the programming in order to interrupt the predetermined execution of the programme, for example, to control the rapid heating or cooling of the vat, or the taking of measurements.

The storing of the programme is constituted according to the invention by memories such as PROM or recording cassettes.

It can be constituted either from a single program by memory or from several programs able to be called separately by the key-board.

The man skilled in the art could, from what is described, envisage numerous variants without departing from the scope and spirit of the present invention that covers the installations, process and products resulting therefrom.

What is claimed is:

1. Vinification apparatus including at least one vat containing the fermenting must, at the upper level of which is formed a hat of solid components, said apparatus comprising:
   (a) means for cooling and heating the contents of said vat and including a thermal exchanger connected to said vat through lines and a pumping system for drawing off at least a part of the must and, after thermal exchange, for reinjecting the must into said vat; and
   (b) programmed control means for controlling said thermal exchanger and said pumping system to establish in said vat predefined temperature gradients in space and predefined temperature variations in time on the basis of temperatures measured by a plurality of sensors disposed to measure various temperatures of the contents of said vat, whereby the quality of the produced wine may be controlled accordingly.

2. Apparatus according to claim 1, wherein said programmed control means controls and regulates the clarification of wine prior to bottling.

3. Apparatus according to claim 1, in which said programmed control means is programmed to control the heating and the cooling made in at least two different exchangers.

4. Apparatus according to claim 1, wherein said control means is programmed to control said heating and cooling means and said thermal exchanger as coupled with first, second and third circuits, said first circuit for the liquid to cool or to heat the must, said second circuit for hot fluid and said third circuit for cold fluid.

5. Apparatus according to claim 1, wherein there is included a water boiler for a fluid.

6. Apparatus according to claim 1, wherein there is included a heat pump for heating a fluid.

7. Apparatus according to claim 1, wherein there is included a compressor for cooling fluid.

8. Apparatus according to claim 7, wherein there is included coupling means for drivingly connecting said compressor with a tractor.

9. Apparatus according to claim 1, wherein said pumping system operates permanently without air in a corresponding circuit.

10. Apparatus according to claim 9, wherein there is included port means associated with said vat for withdrawing liquid from said vat beneath the upper level of the hat.

11. Apparatus according to claim 1, wherein there is included an injector associated with said vat for injection of a temperature controlled liquid therein.

12. Apparatus according to claim 11, wherein said injector is disposed immediately beneath the hat.

13. Apparatus according to claim 11, wherein said injector is disposed immediately above the hat.

14. Apparatus according to claim 1, wherein there is further included a column mounted to extend from the top of said vat into the liquid for drawing off that liquid immediately beneath an upper surface of the liquid within the vat, and a nozzle mounted with respect to said vat for injecting the liquid at a point beneath said upper surface.

15. Apparatus according to claim 14, wherein there is included a plurality of temperature probes mounted to measure the temperature of the liquid within said column.

16. Apparatus according to claim 14, wherein said column is cylindrical in shape.

17. Apparatus according to claim 14, wherein said column is prismatic in shape.

18. Apparatus according to claim 14, wherein there is included means for adjusting the height of said column with respect to said upper surface of the liquid within said vat.

19. Apparatus according to claim 14, wherein said injector is disposed within a side of said column.

20. Apparatus according to claim 1 when the hat includes an aerobic action zone, and said column has an input end disposed in proximity with said aerobic action zone.

21. Apparatus according to claim 1, wherein there is further included a column mounted to extend from the top of said vat and extending into the liquid for drawing off that liquid immediately beneath an upper surface of the liquid within the vat, and a nozzle mounted with respect to said vat for injecting liquid at a point above said upper surface.

22. Apparatus according to claim 1, wherein there is included an injector disposed within an access door of said vat.

23. Apparatus according to claim 1, wherein there is included an injector whose orientation may be variably set to direct liquid along a selectable direction into the vat.

24. Apparatus according to claim 1, wherein there is included a first conduit for drawing off liquid from said vat; a second conduit for injecting liquid into said vat; said means for heating and cooling including first means associated with said first conduit and including a first valve, and second means in connection with said second conduit and including a second valve; said control means programmed to control said pumping system and said first and second valves in order to obtain desired temperature gradients throughout the liquid in said vat in accordance with a timing program.

25. Apparatus according to claim 1, wherein said means for cooling and heating and said control means are associated with a plurality of vats.

26. Apparatus according to claim 1, wherein said control means is programmed to effect proportional action adjustment.

27. Apparatus according to claim 1, wherein said control means is programmed to effect a linear control as a function of time.

28. Apparatus according to claim 1, wherein said control means is programmed to effect a non-linear control as a function of time.

29. Apparatus according to claim 1, wherein said control means includes memory means for storing the program in the form of a prerecorded tape cassette.

30. Apparatus according to claim 1, wherein said control means includes a memory for storing the program in the form of a prerecorded memory.

31. Apparatus according to claim 1, wherein there is included a strainer floating on the surface of the liquid in said vat for withdrawing liquid therefrom.

32. Apparatus according to claim 31, wherein there is included a temperature sensor mounted on said strainer.

33. Apparatus according to claim 32, wherein there is included a valve for controlling the flow of injected air in response to commands provided by said control means.

34. Apparatus in accordance with claim 33, wherein said control means comprises a clock for controlling the opening and closing of said valve as a function of time.

35. Apparatus according to claim 1, wherein there is included means for injecting air into the liquid of said vat to effect a "rise" of the vinification process.

36. Apparatus according to claim 35, wherein there is included a temperature sensor for measuring the temperature of the liquid in said vat, said control means responsive to the output of said sensor for controlling said air injecting means.

37. Apparatus according to claim 1, wherein said control means controls said cooling and heating means for cooling the liquid prior to bottling.

38. Apparatus according to claim 1, wherein said control means is associated with a plurality of vats.

39. Apparatus according to claim 1, wherein said control means includes a recorder for recording the controlled temperature of the liquid within said vat.

* * * * *